United States Patent [19]

Browne

[11] 4,442,624

[45] Apr. 17, 1984

[54] METHOD AND APPARATUS FOR FORMING A COLLAPSIBLE TRAP FOR FLYING INSECTS

[75] Inventor: Lloyd E. Browne, Easton, Pa.

[73] Assignee: J. T. Baker Chemical Co., Phillipsburg, N.J.

[21] Appl. No.: 332,009

[22] Filed: Dec. 18, 1981

[51] Int. Cl.$^3$ ............................................. A01M 1/10
[52] U.S. Cl. ........................................ 43/107; 43/122
[58] Field of Search ................. 43/107, 121, 122, 118; 229/39 R, 8

[56] References Cited

U.S. PATENT DOCUMENTS

| | | | |
|---|---|---|---|
| 1,715,173 | 5/1929 | Opitz | 43/131 |
| 2,518,819 | 8/1950 | Roessler | 43/131 |
| 3,343,744 | 9/1967 | Morell et al. | 43/131 |
| 3,352,053 | 11/1967 | Anderson | 43/131 |
| 3,549,081 | 12/1970 | Nelson | 229/39 R |
| 3,768,720 | 10/1973 | Bundy | 229/39 R |
| 4,260,101 | 4/1981 | Webinger | 229/39 R |
| 4,400,903 | 8/1983 | Seidenberger | 43/122 |

Primary Examiner—Nicholas P. Godici
Assistant Examiner—M. Jordan
Attorney, Agent, or Firm—George W. Rauchfuss, Jr.

[57] ABSTRACT

The present invention provides method and apparatus for forming a collapsible trap for trapping flying insects, particularly Gypsy moths. The trap includes a housing or enclosure with at least one entrance port into said housing for enabling insects to enter, and an overhead shade above this port to guide the insect into the port and to block from the port sunlight, which might otherwise attract the insect away from the trap. A sex lure and a volatile insecticide are provided within the housing to attract insects inside and then to exterminate them. The housing is formed from a single integral sheet of stiffly flexible material, such as water-resistant coated cardboard or plastic, having multiple panels joined together along crease lines acting as hinges. The trap can be folded along two of its crease lines into a flat configuration for advantageously facilitating transport, handling, and storage of the trap in its collapsed state.

24 Claims, 16 Drawing Figures

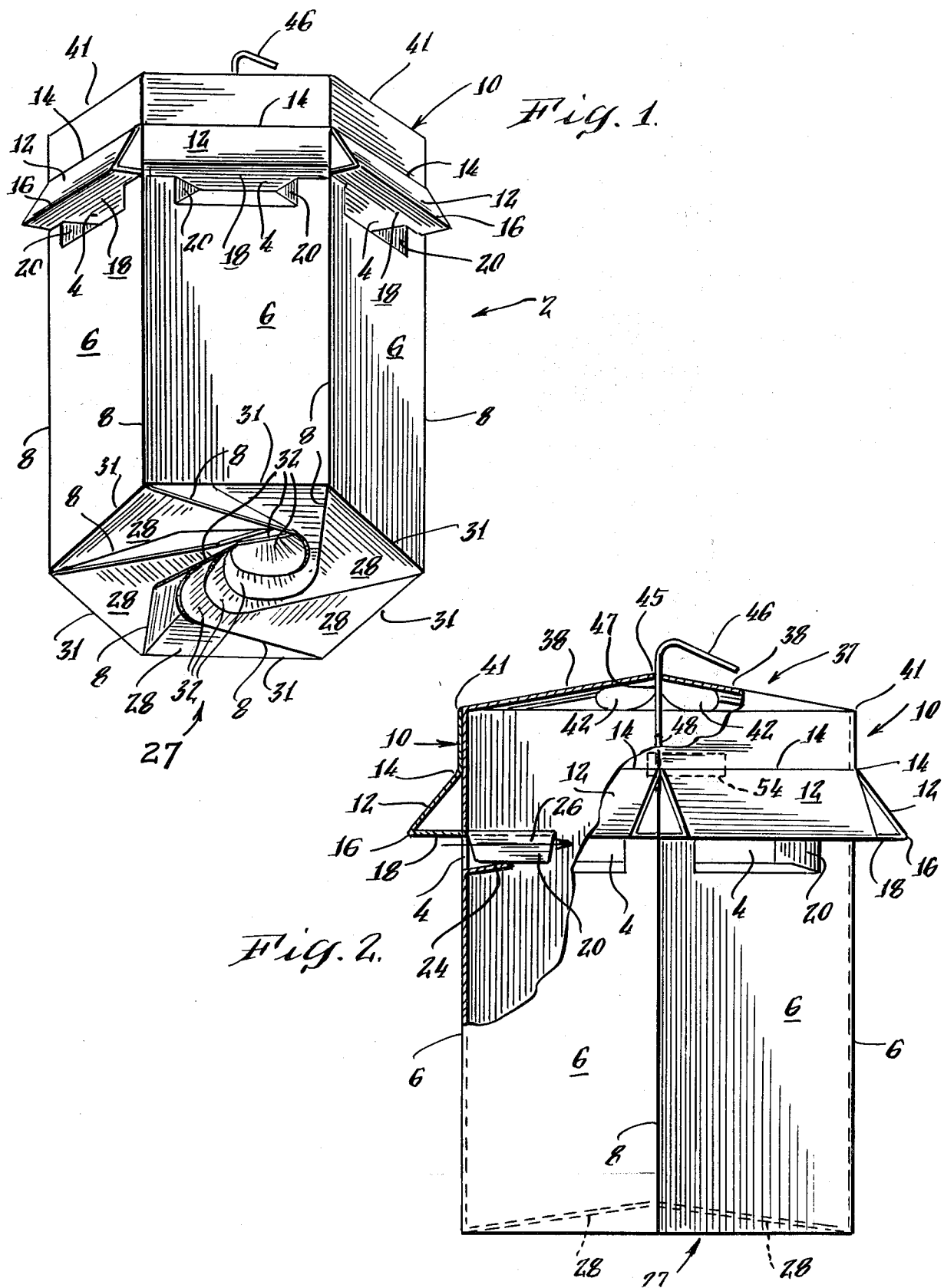

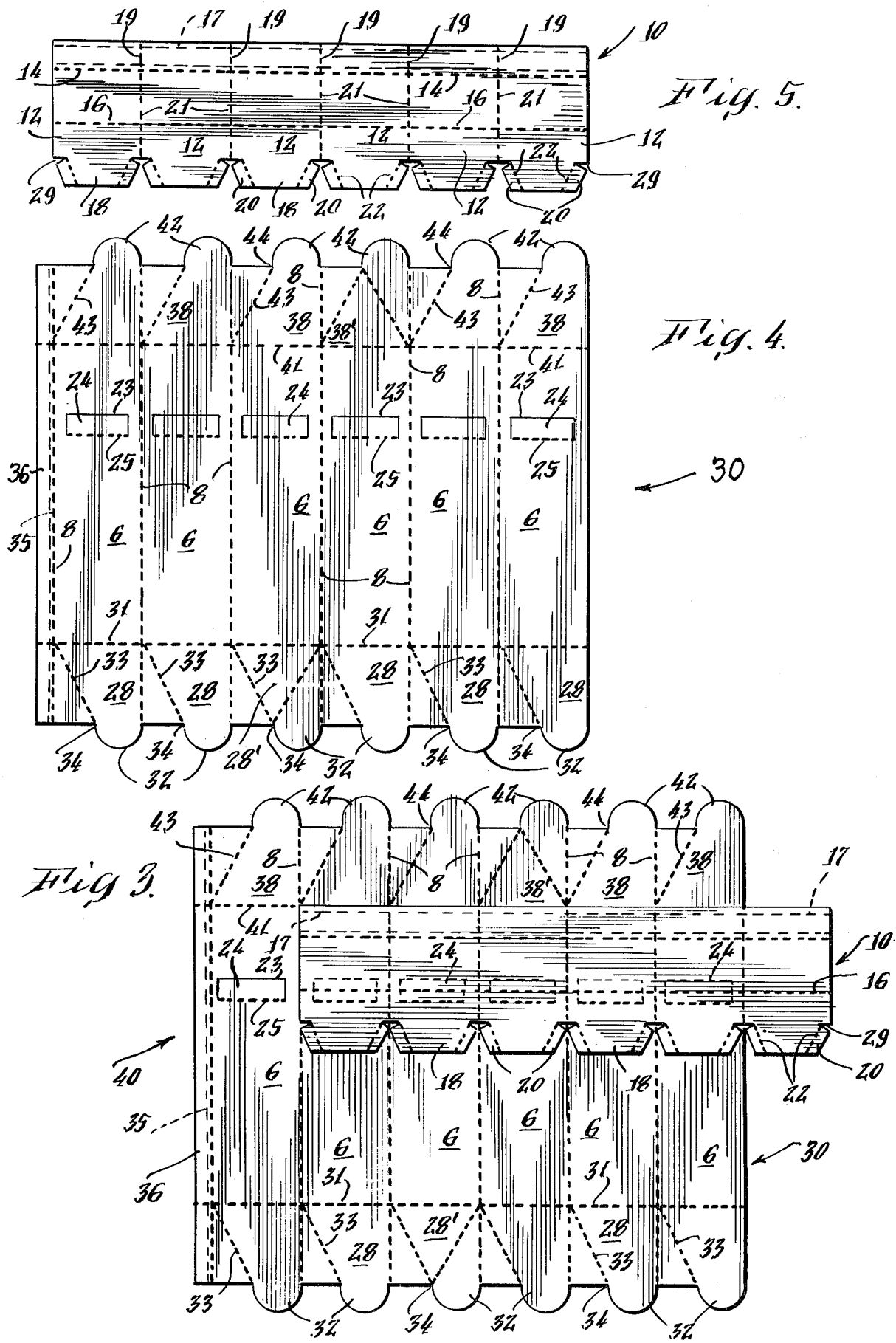

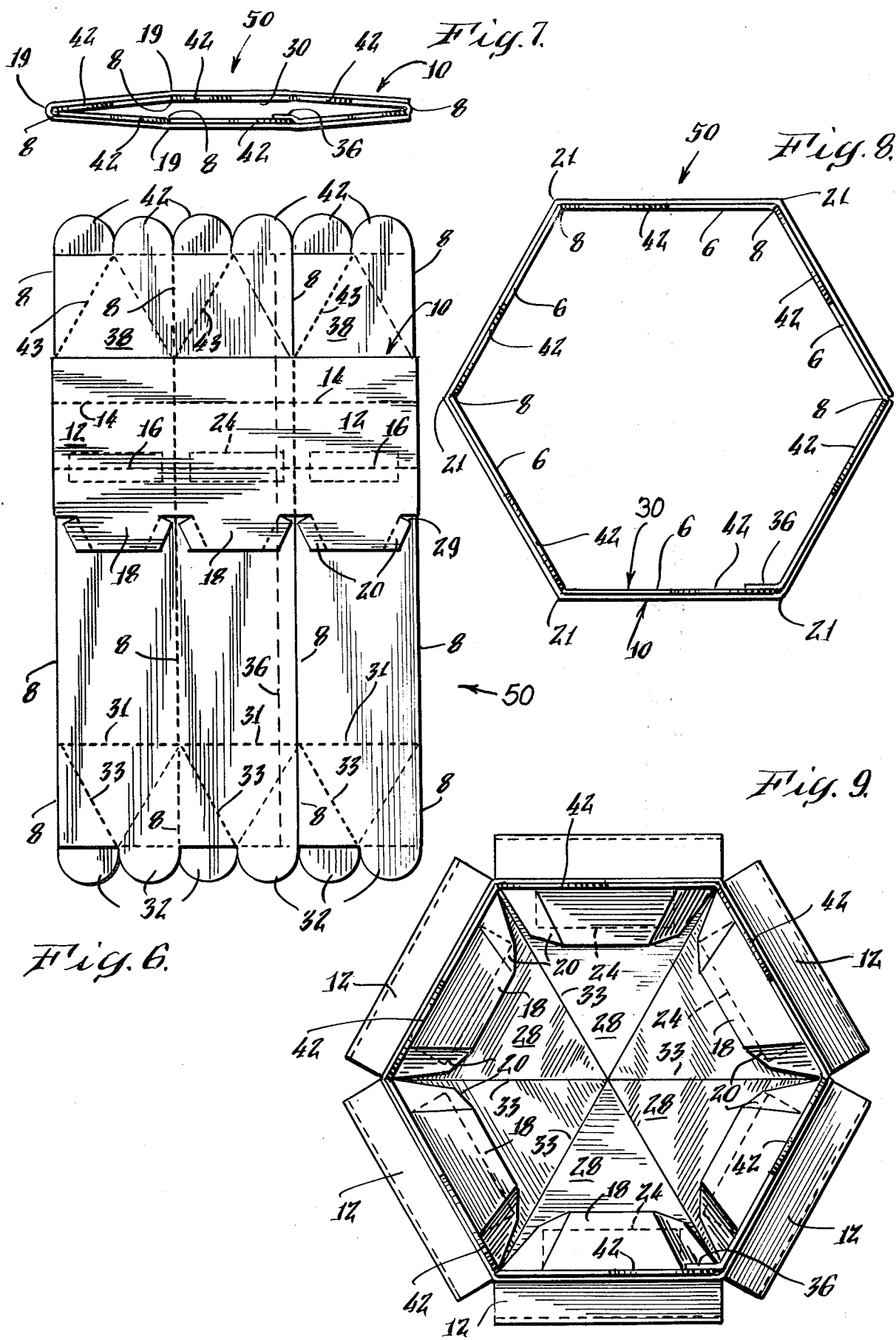

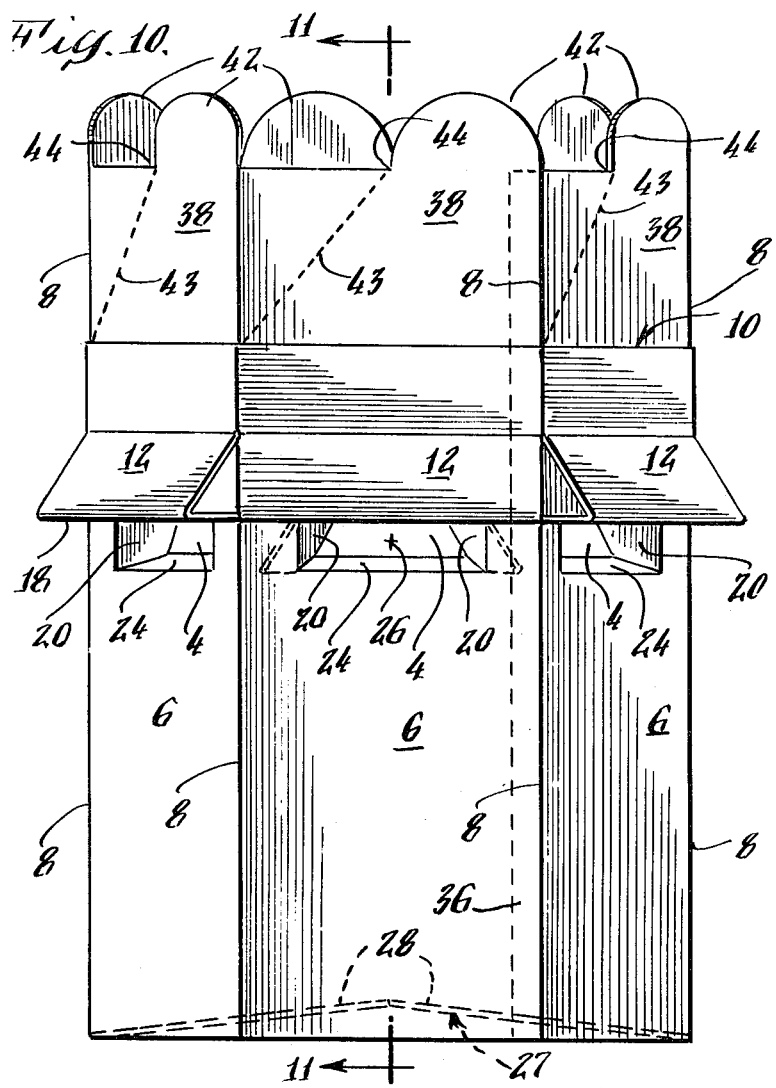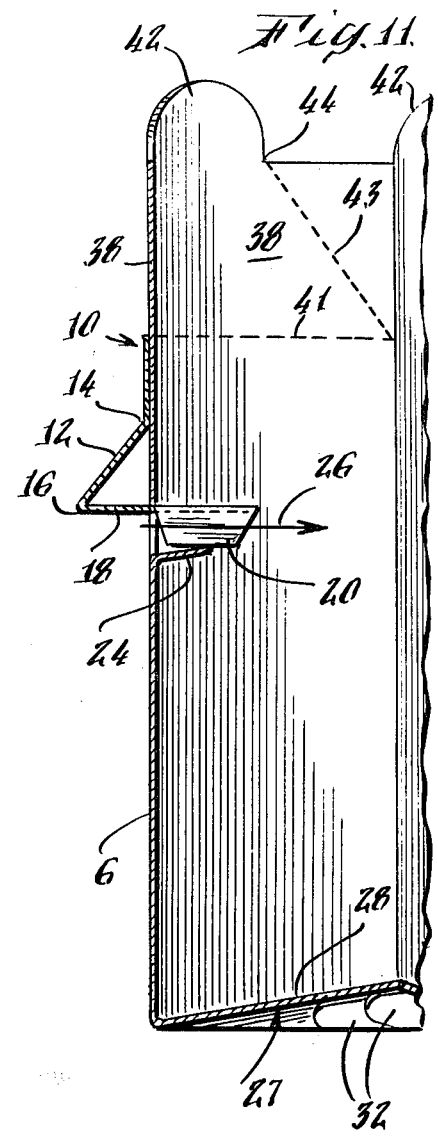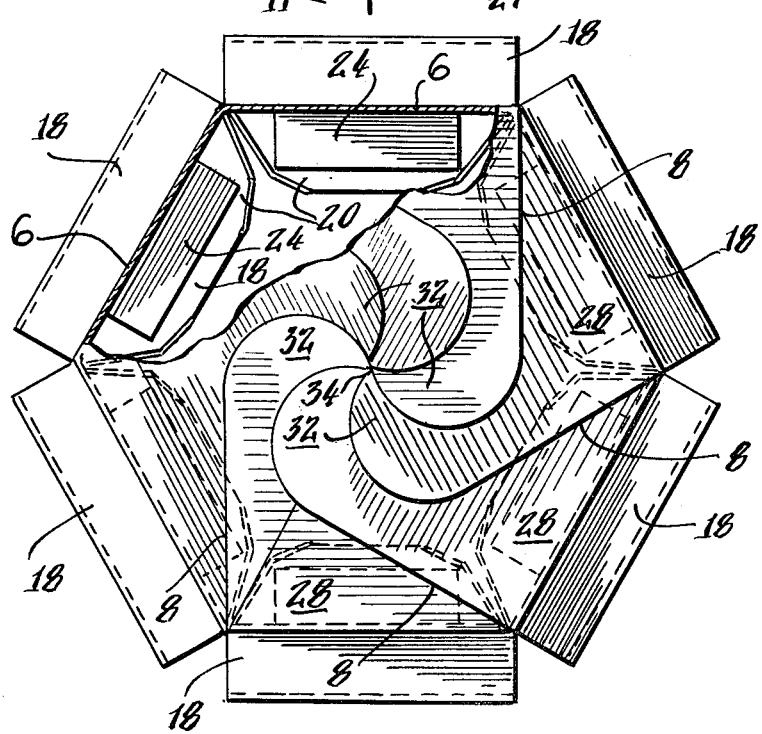

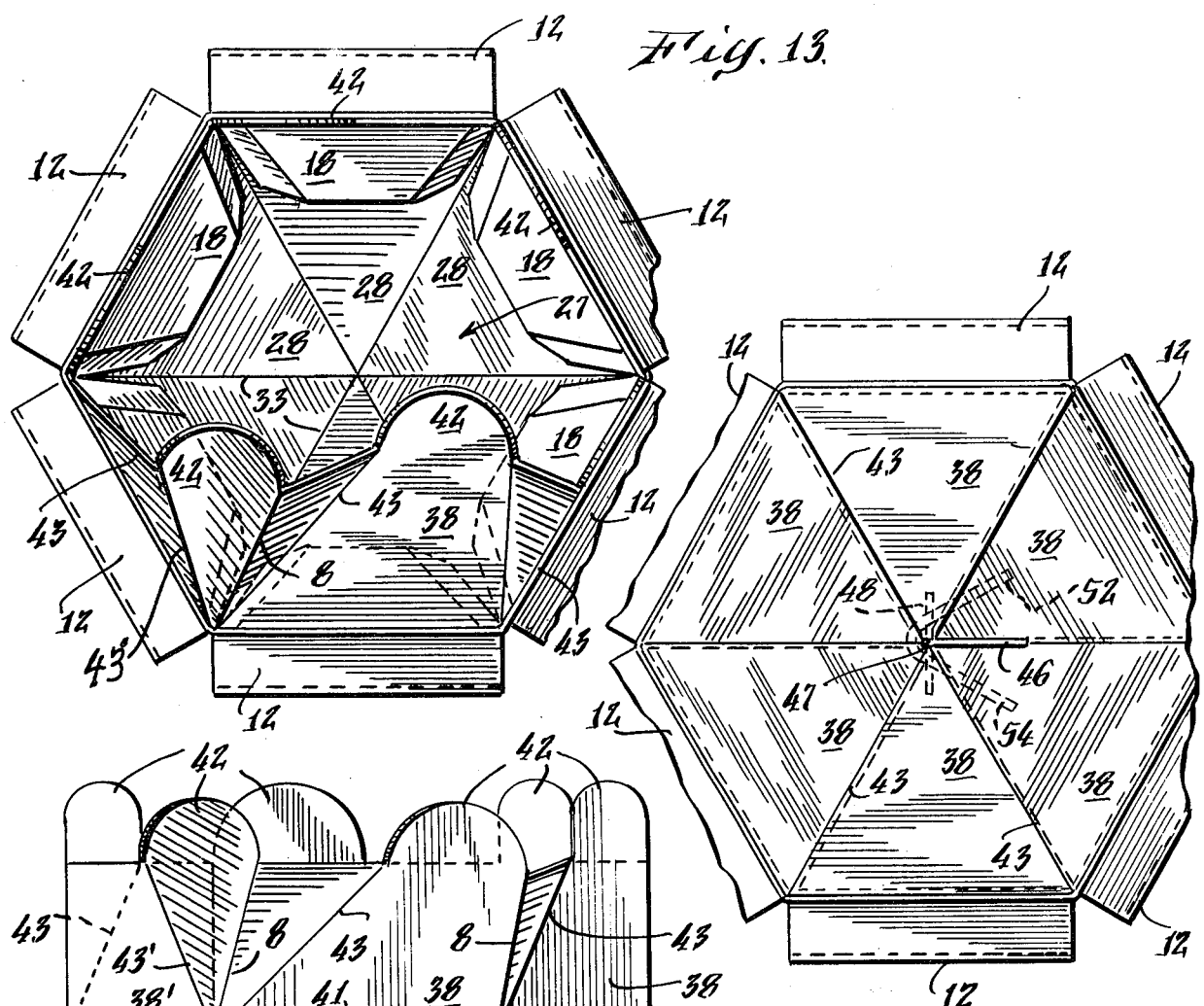

METHOD AND APPARATUS FOR FORMING A COLLAPSIBLE TRAP FOR FLYING INSECTS

BACKGROUND OF THE INVENTION

The present invention provides method and apparatus for forming a collapsible trap for trapping and exterminating flying insects, particularly Gypsy moths.

Gypsy moths are now the most destructive defoliant of hardwood trees in the Northeastern United States. As reported in the New York Times on Oct. 19, 1980, Gypsy moths defoliated a record 5.1 million acres from Maine to Maryland in 1980, causing fifteen times more destruction than in the previous year. It appears that in 1981 the defoliation resulting from these insects was even more widespread and damaging.

A major use of devices for trapping and destroying flying insects, and particularly Gypsy moths, in addition to reducing the incidence of the pest is to aid experts in detecting and estimating the numbers of future populations. Presently, state and Federal agencies deploy Gypsy moth survey traps in a regularized spacing pattern over large areas of land often encompassing several states.

Many traps must be transported by a single person and often into remote areas. Thus, there is advantage to traps that fold into a minimum volume.

Known apparatus currently on the market for trapping Gypsy moths are produced by both the USDA and also by Herculite Products, Inc. of New York. These traps are formed from an opaque milk-carton-shaped housing having a square cross section with a flat bottom and window openings defined in the vertical sidewalls of the housing. A separate peripheral skirt or shade rim including a plurality of inwardly projecting tabs is mounted on the housing above the window openings by inserting the tabs on the shade into corresponding slots provided in the sidewalls of the housing above the windows.

This known "milk carton" type of trap is manufactured, shipped and stored in its three-dimensional configuration, creating difficulties and incurring considerable costs in transporting and storage of such traps. That is, each trap is hollow, i.e., surrounds an enclosed volume of air, and thus it occupies a relatively large volume making it expensive to transport and store large numbers of such traps at the same time. Because the tops of the traps are closed, the housings cannot be stacked or nested. Moreover, the hollow "milk carton" housings and the corresponding shade rims to be mounted thereon are separate pieces. Thus, the separate shad rims must also be transported and stored together with the housings, further compounding the transportation and storage problems of these known traps. The "milk carton" can be obtained from the manufacturer with the ends unsealed which allows the container part of the trap to be collapsed into a flattened configuration. Additional fasteners such as staples or tape are required to close the ends and set up the trap. In all variations of the "milk carton" trap, insects are difficult to remove.

A Gypsy moth trap manufactured by the J. T. Baker Chemical Co. and sold under the trademark "Bag-A-Bug" provides an advantageous method and apparatus for trapping flying insects exhibiting phototropic behavior. This trap is manufactured in a hollow three-dimensional configuration, and is shipped and stored in that configuration. Moreover, the housing can be formed from separate upper and lower housing sections adapted to be joined together during assembly.

It is an object of the present invention to provide a method and apparatus for forming a collapsible trap for trapping flying insects in a housing formed from a single, integral sheet of stiffly flexible material which can be folded into a flat collapsed configuration to advantageously facilitate shipping and storage by reducing the volume occupied by each trap to an absolute minimum. Subsequently, during set-up of the trap, it can be readily and quickly assembled into a three-dimensional housing surrounding an enclosure without the need to assemble together different, separate components. As such, the new trap eliminates both the transportation and storage difficulties of the aforementioned apparatus and provides a toggle-close mechanism whereby trapped insects are easily removed.

SUMMARY OF THE INVENTION

The present invention provides a method and apparatus for forming a collapsible trap for trapping and exterminating flying insects, particularly Gypsy moths. The trap includes a housing having at least one entrance port through which insects enter the trap, an overhead shade above the port for guiding the insect through the port and for blocking distractive sunlight from the port, and includes means for accommodating a sex lure and an insecticide within the trap. The housing is formed from a single sheet of stiffly flexible material including a plurality of panels joined together along pre-existing crease lines for acting as hinges. The housing can be folded along two of its crease lines into a flat configuration to advantageously facilitate shipment and storage of a large number of traps in a relatively small volume. When assembly is desired, the panels may be swung along the crease lines to form the side walls of a hollow three-dimensional housing. At least one panel is pre-cut with an inverted U-shaped cut so that a portion of the side wall can be punched inwardly to define one entrance port in the assembled housing with an inwardly projecting baffle. A peripheral skirt including at least one downwardly extending flap is mounted during manufacture above the entrance port region of the panel. This downwardly extending flap can be folded into an outwardly downwardly sloping position to define an overhead shade or shield above the entrance port in the panel. Then the lower end of this sloping shade is inserted into that port to provide a guide for insects entering the opening. Flaps integrally hinged to the upper ends of the panels can be folded into a closed, upwardly extending, interlocking, fan-like multi-faceted outwardly convex roof configuration. Similar flaps integrally hinged to the lower ends of the panels can likewise be folded into a closed, multi-faceted outwardly concave bottom. Both the roof and the bottom readily can be opened merely by separating the respective interlocking flaps.

Accordingly, the method and apparatus embodying the present invention provide an insect trap advantageously formed from a single sheet of material which can be shipped and stored in a flat, space-saving configuration, and which can be readily assembled by folding into an integral, single-piece housing, including an integrally attached shade, with entrance ports below the shade and internally projecting baffles inside of each window for inhibiting exit of the trapped insects.

The various features, objects, aspects and advantages of the present invention will become more fully understood from a consideration of the following description of a presently preferred embodiment in conjunction with the accompanying drawings, which illustrate the best mode now contemplated by the inventor for placing the invention in practice. In the drawings the same reference numbers are used to indicate the same elements throughout the various views.

BRIEF DESCRIPTION OF THE DRAWINGS

FIG. 1 is a perspective view of the preferred embodiment of an assembled trap for flying insects in accordance with the present invention.

FIG. 2 is a side elevational view partly in section, of the embodiment of the invention illustrated in FIG. 1.

FIG. 3 illustrates the blanked out material for forming the trap of FIGS. 1 and 2. This blank is in a flat, precreased unassembled state, including a main sheet blank and a skirt strip attached to the main blank.

FIG. 4 illustrates the main blank shown in FIG. 3 prior to attachment of the skirt strip.

FIG. 5 illustrates the skirt strip separately. This skirt strip is shown in FIG. 3 attached to the main blank.

FIG. 6 is a side elevational view of the flat, tubular unit of the unassembled trap in its manufactured state ready for shipping to the user. The edge portion of the main blank has been overlapped with and attached to the opposite edge portion to make the tubular configuration.

FIG. 7 is a top plan view of the flattened tubular unit of FIG. 6.

FIG. 8 is a top plan view showing how the user takes the flat trap unit of FIGS. 6 and 7 and begins to form the trap, namely, the flat trap is shaped or hinged along its pre-formed crease lines into a hexagonal tubular configuration.

FIG. 9 is a top plan view of the partially formed trap after it has been folded into a hexagonal configuration. The attached skirt of FIG. 3 has been folded into a shade configuration, and the bottom of the trap has been folded and interleaved into its closed position.

FIG. 10 is a side elevational view of the trap at the stage of forming as illustrated in FIG. 9.

FIG. 11 is a partial sectional view of the trap of FIG. 10 as seen along directional arrows 11-11 of FIG. 10 showing the arrangement of a shade and the associated entrance port and internal baffles.

FIG. 12 is a bottom plan view of the almost fully formed trap shown in FIGS. 10 and 11. A portion of FIG. 12 is in section to show internal structure.

FIG. 13 is a top plan view of the trap of FIG. 10 in which some of the top flaps have been folded inwardly to begin forming a closed top.

FIG. 14 is a side elevational view of the top portion of the trap with the partially closed top as shown in FIG. 13.

FIG. 15 is a top plan view of the trap shown in FIG. 10 with the top now completely assembled folded closed. A hanger for suspending an insecticide or attractant in the trap is mounted or inserted in the center of the fully closed top, and FIG. 16 is a cross-sectional view which illustrates the closed top of the trap as shown in FIG. 15 as seen looking upwards from within the trap. The lower portion of the hanger is seen in FIG. 16 with attractant and insecticide mounted thereon.

DESCRIPTION OF THE PREFERRED EMBODIMENTS

FIGS. 1-16 illustrate the preferred embodiment of the method and apparatus for forming a collapsible trap for entrapping flying insects, particularly Gypsy moths, in accordance with the present invention. It is noted that for purposes of clear illustration, FIGS. 10-16 show the bottom of the trap folded closed by the user before the top is folded closed. It is actually easier for the user to fold the top closed before the bottom is closed, because the user can reach through the open bottom of the enclosure to facilitate interleaving of the top flaps and their tabs for forming the closed top. Also, reaching in through the open bottom facilitates installing the mounting hook in the top with the attractant and insecticide. Then the bottom is closed as the last step. The interleaved flaps which form the bottom have their tabs on the outside of the enclosure where they can readily be manipulated from the outside. Conversely, the interleaved flaps of the top have their tabs on the inside of the enclosure.

FIGS. 1-2 illustrate the insect trap in its completely assembled state. The trap includes a housing, shown generally by the reference numeral 2, and a plurality of entrance ports or openings 4 defined in the housing. The housing is hollow and is formed from a closed sidewall including a plurality of panels 6 joined to each other at their abutting lateral edges along a plurality of hinge lines or crease lines 8. In the illustrated embodiment, six panels are folded along their respective lines 8 to form a hollow hexagonal-shaped housing.

A peripheral skirt 10 is mounted by attachment during manufacture to the top of the panels 6 above the openings 4. Flaps 12, which extend downwardly from this skirt are first folded outwardly from the panels 6 along a pre-formed crease line or hinge line 14 and then are folded horizontally inwardly along another parallel pre-formed crease line or hinge line 16 such that a tongue 18 is defined on the lower end of each flap 12 to be received in each respective entrance port 4 in the panel. As such, the six downwardly and outwardly sloping flaps 12 provide an overhead shade or shield above each of the six entrance openings 4 in the housing 2.

The portion of the tongue 18 extending into the opening 4, and two trapezoidal-shaped side members of tabs 20 (please see FIGS. 3, 5 and 6) laterally joined to the sides of this tongue and folded downwardly along respective pre-formed crease or hinge lines 22, define an upper wall and two sidewalls lining the inside of the opening 4 projecting inwardly into the interior of the housing 2 in the nature of a top baffle and two side baffles. The inward projection of these entrance port liners or baffles into the interior of the housing can also be seen in FIGS. 11 and 12. These baffles inhibit the exit of any insect from within the trap. Each entrance opening 4 is formed by an inverted wide U-shaped cut 23 (FIG. 4) which extends most of the way across the respective panel 6. A pre-formed crease line or hinge line 25 (FIG. 4) extends across between the ends of this U-shaped cut 23. Thus, a tab 24, joined to the panel 6 at the lower horizontal periphery of the opening 4 can be folded inwardly into the opening along the line 25 to provide a lower wall lining the lower portion of the opening. This infolded tab 24 projects into the interior of the housing in the nature of a bottom baffle (FIGS. 2, 11 and 12). Accordingly, the tongue 18, the side members 20, and the tab 24 define a generally rectangular passageway 26 (FIGS. 2 and 11) directed inwardly into the housing from the entrance opening 4. It is noted from FIGS. 3 and 5 that the sides of the tongue 18 converge inwardly so that the side members 20 of the passageway 26 converge towards each other when these side members are folded down along the respective lines 22. Also, it is noted that the side members 20, when folded down from the tongue 18, abut against the top surface of inwardly folded tab 24 to keep that tab in an approximately horizontal or slightly inwardly upwardly sloping infolded position to prevent this tab from rising and obstructing the opening 4.

FIG. 5 shows the skirt strip 10 as blanked out flat from stiffly flexible sheet material, for example such as cardboard covered with a waterproof coating or such as sheet plastic. The crease lines or hinge lines 14, 16 and 22 are provided by crimping or embossing a groove in the sheet material or by a line of perforations or by scoring a line. The respective flaps 12 are separated one from another by cut lines 21 which terminate at the level of the crease or hinge lines 14. Continuing up from the ends of the cut lines 21 are short crease or hinge lines 19. A band 17 of adhesive or glue extends along the skirt blank 10 on its inside surface near its top edge for attachment during manufacture to the main blank 30 shown in FIG. 4, thus forming the flat manufactured unit 40 shown in FIG. 3. In the skirt blank 10 there are a pair of notches 29 on the sides of the tongue 18 above the tabs 20 near the lower end of each shade flap 12. These notches 29 serve as locating stops for assuring that the user inserts the predetermined desired amount of the tongue into the entrance port 4. Above the notches 29 the flap 12 is too wide to enter the port.

During manufacture, a band of adhesive or glue 35 is applied along a narrow vertical flap 36 at one edge of the unit 40 (FIG. 3). Then, this flap 36 is underlapped with the opposite vertical edge as seen in FIGS. 6, 7 and 8 to make the tubular unit 50 which can conveniently and economically be shipped flat as shown in FIG. 7. Also, to manufacture this tubular unit the skirt strip 10 may be arranged so that the vertical joint between its ends is offset horizontally from the main seam formed by the under lapped flap 36. Thus, as will be understood from FIG. 3 the projective right end portion of the skirt strip 10 is attached to the left panel of the main blank 30 in making the tubular unit 50 (FIGS. 6, 7 and 8).

For clarity of illustration and description, the forming and positioning by the user of the shades or shields 12 in association with each entrance port 4 has been illustrated and described first. In most cases, the user will form the top closure of the trap and then form the bottom closure before finally forming and positioning these shades 12.

For clarity of illustration and description, the structure and method of forming the bottom closure will now be described.

Referring now to FIGS. 1, 2, 3 and 4 the closed bottom 27 of the housing 2 is formed by the user from a plurality of overlapping and interconnected flaps 28 integrally extending from the bottom of the panels 6 on the main blank 30 (FIGS. 3 and 4). The flaps 28 are folded inwardly along horizontal hinge or crease lines 31 where these flaps join the lower ends of the respective panels 6. Each flap 28 includes a diagonal crease or hinge line 33 starting at the same respective end of the horizontal hinge line 31 and terminating at the midpoint 34 of the lower edge of the flap 28. One of the six flaps, namely flap 28[1] includes a second diagonal crease or hinge line 33[1] starting at the opposite end of the horizontal hinge line 31 and extending to the mid-point 34. There is a semi-circular tab portion 32 projecting down from the lower edge of each flap 28. Each semi-circular tab 32 has a diameter equal to one-half of the width of the flap 28 and is offset in a corresponding eccentric location on the respective flap, being located entirely to one side of the mid-point 24. It is noted that the main crease or hinge lines 8 which join the main sidewall panels 6 extend down between the respective flaps 28. Since the mid-point 34 of the bottom edge of the flap 28 is located beside the tab 32 there is defined a reentrant corner or notch at this point 34 on the lower edge of each flap. These notches at 34 interlock each flap 28 with the adjacent flap when the flaps are folded into interleaved relationship. The flaps, after being successively folded inwardly from the bottom of the panels 6 along the lines 31 (with the lines 8 being folded inwardly and the lines 33 and 33[1] being folded outwardly), are pressed upwardly into the housing beyond the horizontal until the notches at 34 interlock at the center of the bottom to form a concave closed bottom or floor surface 27. The crease 33[1] is then flattened. The upwardly directed toggle action on the flaps tends to lock adjacent flaps together through the respective notches in the flaps and the interleaved tabs 32. The closed bottom or floor surface 27 may be opened readily by merely pulling downwardly on any one of the rounded tabs 32 past the horizontal toggle position where the respective notches 34 disengage from their interlocking relationship. It is to be understood that the purpose of the extra inclined crease line 33[1] on the one flap 28[1] is to facilitate the successive folding of the flaps 28 and the interleaving of the rounded tabs 32 for engaging the notches 34 against each other, but this crease 33[1] is flattened in the completed bottom 27.

Once the bottom 27 has been formed and thereafter opened, it can readily be reclosed by pressing the flaps 28 inwardly with the palm of the hand while rotating the hand clockwise for urging the tabs 32 into their progressive interleaved relationship, i.e., in an interlocking overlapping swirl pattern with all of the notches 34 engaging against each other. As soon as the flaps 28 have thus been pushed up into a horizontal position, the bottom "pops" or springs upwardly into its final concaved position. This upward "popping" or springing of the bottom takes place because there is a toggle effect occurring. The maximum compression of the notches 34 against each other occurs when the flaps 28 are horizontal, and thus their horizontal position is the unstable toggle position or so-called dead-center position. As the flaps are urged upwardly by the palm past this horizontal dead-center toggle position, they spring up to the convex up and concave down stable position as shown in perspective in FIG. 1 and as shown in section in FIGS. 2, 10 and 11. Thus, the stable closed bottom 27 retains the dead insects. Yet, it can quickly and easily be opened by pulling on a tab 32 for dumping out the contents and for providing access for replacing the attractant and insecticide with fresh quantities.

The structure and method of forming the top closure will now be described. Referring now to FIGS. 2, 3, 4 and 13-16, a plurality of top flaps 38, which are shaped identical to the bottom flaps 28 as mirror images thereof are used to form the closed top or roof 37 to the housing 2. Specifically, each flap 38 extends integrally from the top of a panel 6 along a horizontal crease or hinge line 41. The flaps 38 each include a diagonal crease or hinge line 43 starting at the same respective end of the horizontal crease or hinge line 41 and terminating at the midpoint 44 of the top edge of the flap 38. One of these six top flaps, namely the flap $38^1$, includes a second diagonal crease or hinge line $43^1$ starting at the opposite end of the horizontal line 41 and extending to the midpoing 44. The offset top tabs 42 are the same size as the bottom tabs 32 and define reentrant corners or notches at 44. The main vertical hinge lines 8 extend up between the respective top flaps 38.

In forming the closed top or roof 37, the user uses a sequence on the crease lines 8, 43 and $43^1$ similar to that which has been described for the bottom. This sequential folding procedure is illustrated in FIGS. 13 and 14. In other words, the lines 8 are folded inwardly, and the lines 43 and $43^1$ are folded outwardly. The outward folding along line $43^1$ is used temporarily to form the top 37 with the flaps 38 overlapped, the notches 44 engaged against each other and the tabs 42 interleaved with each other as seen in FIG. 16, forming an interlocking overlapping swirl pattern. The completed roof 37 is convex upward for shedding rain, with six triangular appearing sloping roof surfaces as seen in FIGS. 2 and 15.

The flaps overlap and interlocked to adjacent flaps by notches 40, which are identical to the notches 34 of the flaps 28. The top is closed by pressing the flaps 38 downwardly into the housing until the notches interlock to form a closed, convex-shaped roof. The upwardly directed beyond-dead-center toggle action of the flaps tends to maintain the notches 44 securely interlocked. The roof may be opened by pushing downwardly on the flaps 38 until the notches 44 of the flaps 38 are disengaged from their interlocking relationship by depressing the roof below the horizontal toggle position. It is to be noted that the outwardly directed forces in the flaps 28 and 38 forming the bottom and the top of the housing 2 resulting from their stable toggle relationship tend to keep the panels 6 of the housing rigidly held in their regular hexagonal orientation with respect to each other as seen in plan sectional view.

In order to provide a firm beyond-dead-center toggle action in forming the stable top 37 and stable bottom 27, certain geometric relationships need to be observed. Looking at the regular hexagonal configuration seen in FIG. 8, it will be noted that the distance across the hexagon from one of the hinge lines 8 to the diametrically opposite hinge line 8 is exactly equal to twice the width of one of the panels 6. When the top 37 is closed and is seen from above (FIG. 15), it is to be noted that the fold lines 43 extend diametrically across the regular hexagonal configuration. Similarly, when the bottom 27 is closed and is seen from above (FIG. 13), the fold lines 33 extend diametrically across the regular hexagon. Therefore, in order to provide a firm beyond dead-center toggle action for stabilizing the top 37 and the bottom 27, the length of each fold line 43 to the notch 44 (FIG. 3 or 4) is slightly longer than the width of the panel 6 as measured along a hinge line 41, and similarly the length of each fold line 33 to the notch 34 (FIG. 3 or 4) is slightly longer than the width of the panel 6 as measured along a hinge line 31. In this context "slightly longer" means approximately 1% to 3% longer. Less than this range produces a loose or slack toggle action. More than this range produces too tight a toggle action tending to crush the edges of the flaps of the sheet material in the regions of the mutually engaging notches 44 or 34.

The housing, including the panels, tabs and flaps, as discussed above, is preferably formed from an inexpensive, lightweight, stiffly flexible sheet material, as for example, cardboard coated with a waterproofing layer on both its inner and outer surfaces or formed from stiffly flexible sheet plastic.

Referring now to FIGS. 2 and 15-16, a small opening 45 is defined in the center of the closed top 37 of the housing 2. A hanger hook 46 has its shank 47 (FIG. 2) received through this top opening 45. A coil-spring holder 48 defined on the bottom of the shank 47 is located in the housing 2. A first controlled-release strip 52 containing a volatile insecticide DDVP (which is phosphoric acid 2, 2-dichloroethenyl dimethyl ester) and a second controlled-release strip 54 containing an insect sex lure such as phermone ([+]disparlure) for male Gypsy moths ar removably mounted within the coil spring 48 and thus are suspended within the housing by the hook. Controlled-release devices, such as strips 52 and 54, are generally known in the art, and reference is made to U.S. Pat. No. 3,864,468 for further information.

The hook 46 is mounted in the housing as follows. The strips 52 and 54 are secured within the coil spring. The bottom of the housing is opened by opening the flaps 28, and the straight shank 47 of the hook is inserted up through the hole 45 in the center of the top 37 of the housing from within the housing. The portion of the shank extending upwardly above the top of the housing is then bent over into a hook configuration to prevent it from slipping back into the housing, as shown in FIG. 2. The bottom of the housing is then closed by pressing the flaps 28 back into the housing until they interlock and toggle up into their stable position. The strips 52 and 54 are thus suspended in the housing. The hook can be readily removed from the housing by reversing the above described procedure. The trap itself may be suspended from an overhead support such as a tree branch, a wire or a cord, by the hook portion 46 of the shank extending above the top 37 of the trap. The coil spring 48 is wider than the small opening 45 in the top of the housing so that the trap will not slip off from the hook when the trap is suspended by the hook.

In operation, the sex lure suspended within the trap attracts insects into the trap through the entrance openings 4. Because a plurality of openings are defined in the housing, wind currents passing through the openings spread the volatile attractant nearby outside of the trap. Insects near the trap pick up the scent and follow it to its source. Thus, the insects are attracted into the housing through the openings 4 and passages 26. Once inside, they are killed by the volatile insecticide within the housing. It is to be noted that the shade 12 defined above each opening 4 blocks sunlight from the entrance to the opening to prevent a distraction to insects exhibiting phototropic behavior when they are entering the trap through the openings. Also, the passageways 26 extending inwardly inside of the openings 4 tend to guide insects through the opening and into the trap, and to some extent, also block distracting light. The inwardly extending side walls and top and bottom surfaces of the passageways 26 also act as baffles to tend to block or interfere with escape through the openings 4 of insects trapped within the housing. Thus, the sidewalls and top and bottom surfaces of the passageways 26 perform multi-functions. They structurally support the shade, as discussed above, and they also provide an obstruction to the escape of trapped insects before the insects succomb to the insecticide. Dead insects collect on the upwardly convex floor or bottom 27 of the trap and are conveniently removed by periodically opening the bottom, as previously described.

It will now be understood how the trap described above is readily formed from only a single manufactured unit 50 which is configured (FIG. 7) in a substantially flat, space-saving shape prior to assembly. FIGS. 6 and 7 illustrate the manufactured insect trap unit 50 discussed above in a flat configuration, as it is shipped in a pre-assembled state. The housing 2 includes three panels 6 folded flatly on top of three similar panels along two opposed hinge lines 8.

As discussed above, both the top 37 and bottom 27 of the housing can be opened easily. The top is opened inwardly (downwardly) by pushing down on the respective top flaps 38 until they disengage from their interlocking relationship and fold down into the interior of the trap. The top 37 can be reclosed by pushing the flaps 38 up from inside and by urging the tabs 42 up into their flattened interleaved relationship from inside, which involves opening the bottom 27 for internal access. The bottom 27 is opened downwardly (outwardly) by pulling in any of the tabs 32 as described in detail further above, and is readily reclosed by upward pressure of the palm on the flaps 28 with a clockwise rotary motion for urging the tabs 32 into their flattened interleaved relationship as described above.

Accordingly, the above discussed embodiment of the present invention provides a trap for flying insects which is compact and substantially flat in its manufactured but non-assembled state. It can readily be assembled by the user into its expanded, enclosed housing operational trap configuration. The above discussed embodiment of the trap enables convenient shipment and storage of the flat units 50. The housing of the trap, including an easily closable top and bottom, openings defined in the housing through which insects can enter the housing, and shades above the openings are all formed from a single manufactured unit made from sheet material and which can be assembled without the aid of any tools.

Other modifications of the above discussed embodiment are possible. For example, the entrance ports 4 in the housing can be initially fully punched out during the manufacture of the trap instead of making the inverted U-shaped cut 23, thereby eliminating the need for the user to fold in the tabs 24. However this modification is less desirable than the preferred embodiment discussed above, because the above modification would eliminate the tab 24 from extending into the openings. As discussed above, this tab 24 helps guide insects into the trap through the opening and also tends to obstruct escape of trapped insects.

In any event, the preferred embodiment of the invention illustrated in the drawings and discussed herein is intended to be illustrative and not restrictive of the scope of the invention, that scope being defined by the elements of the following claims and all equivalents thereto.

I claim:

1. The method of forming a collapsible trap for flying insects comprising the steps of:
providing a plurality of panels hinged at their lateral edges to adjacent panels along respective hinge lines for enabling said hinged panels to be collapsed into a flat configuration with said panels in face-to-face contact for convenience in shipping and storing,
providing an entrance port for flying insects in at least one of said panels,
forming the trap enclosure by orienting said panels around said hinge lines to form the side walls of the enclosure,
forming a top for said enclosure,
forming a bottom for said enclosure,
to each panel having an entrance port affixing a shade flap above the respective port,
orienting each such shade flap in a downward outward inclination with respect to the respective panel to provide a downwardly outwardly sloping shade above the respective port,
bending the lower free end portion of each flap inwardly, and
inserting the free end portion of each flap into the respective port for holding the flap in its downwardly and outwardly sloping position forming a shade above the port.

2. The method of forming a collapsible trap for flying insects as claimed in claim 1, including the further steps of:
providing said entrance ports by making wide inverted U-shaped cuts in the respective panels, and
making a hinge line extending across between the ends of the legs of each such U-shaped cut,
whereby the user can bend the resultant flap portion of the sidewall inwardly into the interior like an interior window ledge for forming an interior baffle extending inwardly from the lower edge of said entrance port for inhibiting the exit of insects from the trap through the port.

3. The method of forming a collapsible trap for flying insects as claimed in claim 2, including the further steps of:
providing a hinged side tab on each side edge of the free end portion of the respective shade flaps,
providing a notch in each side edge of the shade flaps above the respective hinged side tab,
inserting the free end portions of the shade flaps into the respective entrance ports as far as said notches for positioning said hinged side tabs within the interior of the enclosure,
positioning the free end portion of the shade flap against the top edge of the respective entrance port, and
folding each of said side tabs downwardly until they engage against the respective interior window ledge,
whereby the inserted end portion of the shade flap, the downwardly folded side tabs and the interior window ledge define a passageway for guiding insects inwardly from the entrance port and act as interior baffles for inhibiting the exit of trapped insects through the entrance port.

4. The method of forming a collapsible trap for flying insects as claimed in claim 1, 2, or 3 including the further steps of:
forming the top of said enclosure by:
providing a plurality of top flaps, each top flap being hinged to the top of a respective panel along a hinge line extending transversely to the respective panel,
swinging said top flaps inwardly and downwardly along their respective hinge lines into closed position above said enclosure for closing the top of said trap, and holding said flaps in their closed position.

5. The method of forming a collapsible trap for flying insects as claimed in claim 1, 2, or 3 including the further steps of:

forming the top of said enclosure by:

providing a plurality of top flaps, each top flap being hinged to the top of a respective panel along a hinge line extending transversely to the respective panel, providing a tab projecting from each top flap in an offset location, swinging said top flaps inwardly and downwardly below horizontal into the interior of said enclosure, engaging said flaps against each other at the center of the top while underlapping said tabs below the neighboring flaps, and pushing the center of the engaged flaps upwardly beyond horizontal for toggling the engaged flaps upward beyond horizontal into a stable above-dead-center toggled position in which the top is convex up and concave down.

6. The method of forming a collapsible trap for flying insects as claimed in claim 1, 2, or 3 including the further steps of:

forming the top of said enclosure by:

providing a plurality of top flaps, each top flap being hinged to the top of a respective panel along a hinge line extending transversely to the respective panel, swinging said top flaps inwardly and downwardly along their respective hinge lines into a closed position at the top of said enclosure for closing the top of said trap with said flaps sloping downwardly outwardly in a roof configuration, and removably holding said top flaps in said closed position by:

providing a tab projecting from each top flap, said tabs being offset in a corresponding location on the respective flaps, and interleaving said tabs in underlapping relationship beneath respective neighboring flaps for interlocking the flaps in a stable position, and inserting a hook through the center of said top for hanging the trap from an overhead support.

7. The method of forming a collapsible trap for flying insects as claimed in claim 1, 2 or 3 including the further steps of:

first, forming the top of said enclosure by:

providing a plurality of top flaps, each top flap being hinged to the top of a respective panel along a hinge line extending transversely to the respective panel, swinging said top flaps inwardly and downwardly along their respective hinge lines into a closed position at the top of said enclosure for closing the top of said trap with said flaps sloping downwardly outwardly in a roof configuration, and removably holding said top flaps in said closed position by:

providing a tab projecting from each top flap, said tabs being offset in a corresponding location on the respective flaps, and interleaving said tabs in underlapping relationship beneath respective neighboring flaps for interlocking the flaps in a stable position, and second, forming the bottom of said enclosure by:

providing a plurality of bottom flaps, each bottom flap being hinged to the bottom of a respective panel along a hinge line extending transversely to the respective panel, swinging said flaps inwardly and upwardly along their respective hinge lines into closed position at the bottom of said enclosure, and removably holding said flaps in their inward closed position for removably closing the bottom of said trap, thereby advantageously enabling the contents of dead insects to be emptied conveniently from said trap by releasing the holding of said flaps and swinging said flaps outwardly for temporarily opening the bottom of said enclosure.

8. The method of forming a collapsible trap for flying insects as claimed in claim 1, 2, or 3 including the further steps of:

forming the bottom of said enclosure by:

providing a plurality of bottom flaps, each bottom flap being hinged to the bottom of a respective panel along a hinge line extending transversely to the respective panel, swinging said flaps inwardly and upwardly along their respective hinge lines into closed position at the bottom of said enclosure, and removably holding said flaps in their inward closed position for removably closing the bottom of said trap, thereby advantageously enabling the contents of dead insects to be emptied conveniently from said trap by releasing the holding of said flaps and swinging said flaps outwardly for temporarily opening the bottom of said enclosure.

9. The method of forming a collapsible trap for flying insects as claimed in claim 8 including the further steps of:

removably holding said bottom flaps in their inward closed position by:

providing a tab projecting from each bottom flap, said tabs being offset in a corresponding location on the respective flaps, during said inward and upward swinging of said flaps engaging said flaps against each other at the center of the bottom of the enclosure while interleaving said tabs in underlapping relationship, and pushing the center of the bottom above horizontal for toggling the engaged flaps upward beyond horizontal into a stable above-dead-center toggled position in which the bottom is convex up and concave down.

10. The method of forming a collapsible trap for flying insects as claimed in claim 9, in which:

said tabs are interleaved with each other in an interlocking swirl pattern, whereby the bottom of the enclosure can be conveniently opened by pulling downwardly on any one of said interleaved tabs for pulling the center of the bottom down below the horizontal for releasing the toggle action and then opening the flaps.

11. The method of forming a collapsible trap for flyinsects as claimed in claim 1, 2, or 3 including the further steps of:

forming the bottom of said enclosure by:

providing a plurality of bottom flaps, each bottom flap being hinged to the bottom of a respective panel along a hinge line extending transversely to the respective panel, swinging said flaps inwardly and upwardly along their respective hinge lines into closed position at the bottom of said enclosure, providing a tab projecting from each bottom flap, said tabs being offset in a corresponding location on the respective flaps, for removably holding said flaps in their inward closed position for removably closing the bottom of said trap, for advantageously enabling the contents of dead insects to be emptied conveniently from said trap by releasing the holding of said flaps and swinging said flaps outwardly for temporarily opening the bottom of said enclosure, during said inward and upward swinging of said flaps engaging said flaps against each other at the center of the bottom of the enclosure while interleaving said tabs in underlapping relationship in an interlocking swirl pattern, and pushing the center of the bottom above horizontal for toggling the engaged flaps upward beyond horizontal into a stable above-dead-center toggled position in which the bottom is convex up and concave down, whereby the bottom of the enclosure can be conveniently opened by pulling downwardly on any one of said interleaved tabs for pulling the center of the bottom down below the horizontal for releasing the toggle action and then opening the flaps.

12. In a trap for flying insects of the type including a hollow housing, means for accommodating an insecticide in said housing, and at least one opening defined in said housing through which insects can enter into said housing, the invention comprising:

said housing being formed from a single unit of sheet material, said unit including a plurality of panels, each of said panels being joined along hinge lines at both lateral edges thereof to the corresponding lateral edges of adjacent panels, said panels being foldable relative to each other along said hinge lines, said panels being selectively foldable between a first compact position in which said panels are folded against each other in face-to-face relationship along two of said hinge lines in a substantially flat tubular configuration and a second expanded tubular configuration in which said panels are oriented along said hinge lines to form the sidewalls of the hollow housing, at least one of said panels having an entrance port therein, said unit of sheet material also including top flaps hinged to the top of said panels along hinge lines extending transversely to the panels and bottom flaps hinged to the bottom of said panels along hinge lines extending transversely to the panels, said top flaps being foldable inwardly and downwardly along said hinged lines into a closed position forming a top for said enclosure after the panels have been folded into said expanded tubular configuration for forming the sidewalls of the enclosure, and said bottom flaps being foldable inwardly and upwardly into a closed position forming a bottom of said enclosure, whereby said trap can be conveniently shipped and stored when collapsed in said substantially flat tubular configuration and can conveniently be formed into the trap by the user, said housing includes a shade flap mounted to the respective panels which have an entrance port defined therein, each such shade flap being mounted above an entrance port, a free end portion of each such shade flap being foldable outwardly from the panel to define a shade projecting outwardly above said opening, the free end of the shade flap insertable within the entrance port for holding the shade flap in its outwardly projecting position.

13. The collapsible trap as claimed in claim 12 wherein:

said entrance port is made by cutting a U-shaped cut in the panel, a hinge line extends between the legs of said U-shaped cut defining a hinged flap within said U-shaped cut, and said hinged flap is displaceable into said housing from said opening in the panel when the user assembles the trap for forming an interior baffle to inhibit exit of a trapped insect.

14. The collapsible trap as claimed in claim 13 further including:

a hinged side tab on each of the side edges of the free end portions of each of said shade flaps, said hinged side tabs being foldable to abut against said hinged flaps displaced into said housing when said trap is assembled, whereby said hinged side tabs tend to prevent said hinged flap from obstructing said entrance port and provide further obstruction to prevent exit of a trapped insect through said entrance port.

15. The collapsible trap as claimed in claim 12 wherein said top flaps are configured and dimensioned to engage with each other in interlocking relationship when said top flaps are folded into said closed position.

16. The collapsible trap as claimed in claim 12 wherein said bottom flaps are configured and dimensioned to engage with each other in interlocking relationship when said bottom flaps are folded into said closed position.

17. In a trap for flying insects of the type including a hollow housing, means for accommodating an insecticide in said housing, and at least one opening defined in said housing through which insects can enter into said housing, the invention comprising:

said housing being formed from a single unit of sheet material, said unit including a plurality of panels, each of said panels being joined along hinge lines at both lateral edges thereof to the corresponding lateral edges of adjacent panels, said panels being foldable relative to each other along said hinge lines, said panels being selectively foldable between a first compact position in which said panels are folded against each other in face-to face relationship along two of said hinge lines in a substantially flat tubular configuration and a second expanded tubular configuration in which said panels are oriented along said hinge lines to form the sidewalls of the hollow housing, at least one of said panels having means for providing an entrance port therein, said unit of sheet material also including top flaps hinged to the top of said panels along hinge lines extending transversely to the panels and bottom flaps hinged to the bottom of said panels along hinge lines extending transversely to the panels, said top flaps being foldable inwardly and downwardly along said hinged lines into a closed position forming a top for said enclosure after the panels have been folded into said expanded tubular configuration for forming the sidewalls of the enclosure, and said bottom flaps being foldable inwardly and upwardly into a closed position forming a bottom of said enclosure, whereby said trap can be conveniently shipped and stored when collapsed in said substantially flat tubular configuration and can conveniently be formed into the trap by the user, said housing includes a shade flap mounted to the respective panels which have said means for providing an entrance port therein, each such shade flap being mounted above said means for providing an entrance port, a free end portion of each such shade flap being foldable outwardly from the panel to define a shade projecting outwardly above said opening, the free end of the shade flap insertable within the entrance port for holding the shade flap in its outwardly projecting position.

18. The collapsible trap as claimed in claim 17 wherein:

said means for providing an entrance port includes a hinged flap formed from a U-shaped cut in said panel, said hinged flap being displaceable into said housing for providing said opening in said panel and for providing an interior baffle to inhibit escape of a trapped insect.

19. The collapsible trap as claimed in claim 17 further including means for removably holding said plurality of top flaps in said closed position.

20. The collapsible trap as claimed in claim 19 wherein said means for removably holding said plurality of top flaps includes a tab projecting from each top flap in an offset location, said tabs being underlapped with respect to adjacent top flaps when said plurality of top flaps are folded inwardly and downwardly along their respective hinge lines.

21. The collapsible trap as claimed in claim 20 wherein said plurality of top flaps and tabs are so dimensioned and positioned to engage adjacent top flaps in an interlocking interleaving stable swirl pattern relationship.

22. The collapsible trap as claimed in claim 17 further including means for removably holding said plurality of bottom flaps in said closed position.

23. The collapsible trap as claimed in claim 22 wherein said means for removably holding said plurality of bottom flaps includes a tab projecting from each bottom flap in an offset location, said tabs being underlapped with respect to adjacent bottom flaps when said plurality of bottom flaps are folded inwardly and upwardly along their respective hinge lines.

24. The collapsible trap as claimed in claim 23 wherein said plurality of bottom flaps and tabs are so dimensioned and positioned to engage adjacent bottom flaps in an interlocking interleaving stable swirl pattern relationship.

* * * * *